July 12, 1949.                D. W. SHOOK                2,475,761
                              TRAILER HITCH
                           Filed Aug. 3, 1946
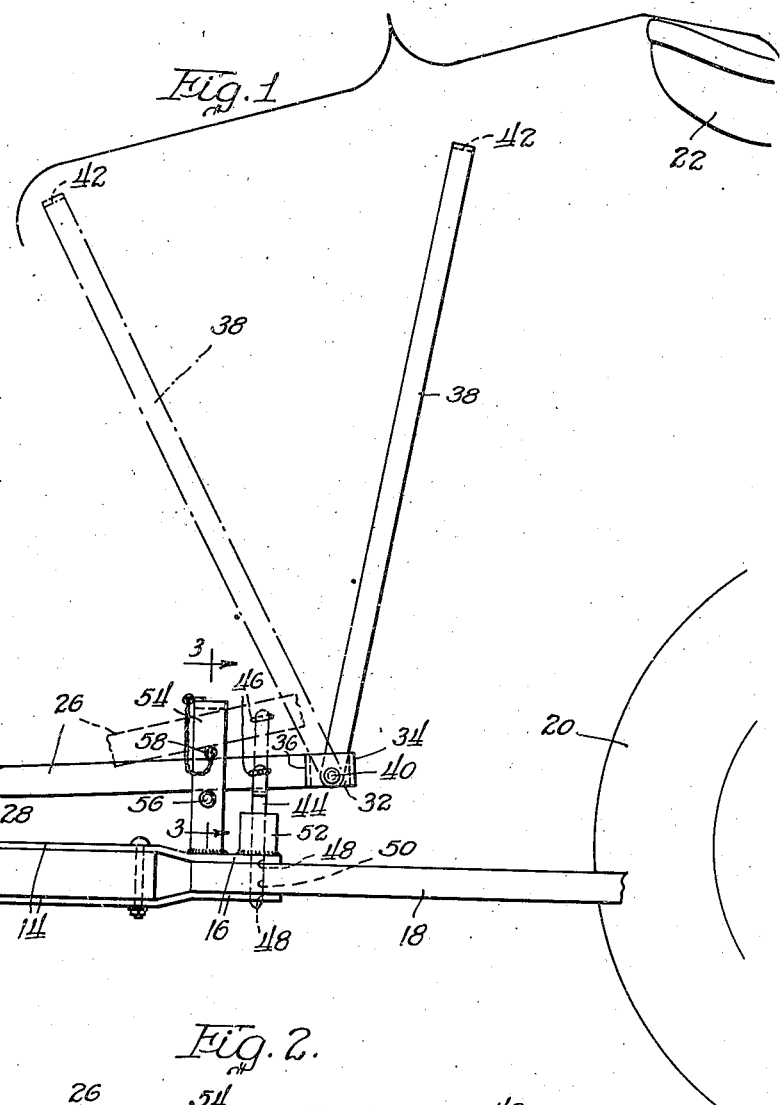
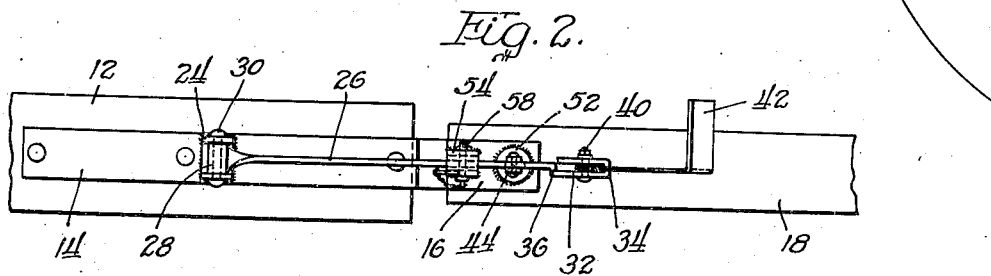
Inventor:
David W. Shook.
By
Bair + Freeman
Attorneys.

Patented July 12, 1949

2,475,761

UNITED STATES PATENT OFFICE 2,475,761

TRAILER HITCH

David W. Shook, Dayton Township, Butler County, Iowa

Application August 3, 1946, Serial No. 688,256

3 Claims. (Cl. 280—33.15)

This invention relates to trailer hitches.

The device is adaptable for making connection between the tongue of a trailing implement and the drawbar of a traction vehicle.

An object of the invention is to enable the operator of the traction vehicle to connect and disconnect the hitch from the operator's station on the vehicle, without the necessity of dismounting for making the connection.

Another object of the invention is the provision of a handle on the hitch which, in one position, is within easy reach of the operator, and which can be swung to an alternate position, where it will be out of the operator's normal area of work, but still within reach by the operator without dismounting.

Another object of the invention is the provision of auxiliary means for locking the hitch in connected position, if so desired, for an extended trip, such as on the road.

Another object of the invention is the provision of means for locking the hitch to disconnected position if so desired.

Another object of the invention is the provision of guide means for one of the connecting elements, so that the hitch can be connected and disconnected by normal actuation by the operator without the necessity of accurate movements.

Another object of the invention is the provision of reinforcing means for securing a solid point of reaction on the tongue of the trailing implement.

With these and other objects in view, my invention consists in the construction, arrangement and combination of the various parts of my device whereby the objects contemplated are attained, as hereinafter more fully set forth, pointed out in the claims and illustrated in the accompanying drawings, in which:

Fig. 1 is a side view of the hitching mechanism, showing the tongue of the trailing implement, the drawbar of the traction vehicle and a portion of the traction vehicle itself, showing the relative position of the operator's station thereon;

Fig. 2 is a top view of the hitching mechanism; and

Fig. 3 is a vertical sectional view taken on line 3—3 of Fig. 1.

Referring now in detail to the drawings, the tongue of the trailing implement is shown at 12, and is provided with metal strips 14 at the forward end thereof, on the top and bottom, respectively. The metal strips 14 extend forwardly of the forward end of the tongue, and are brought closely together at that point, to form a fork 16. Between the two members of the fork 16, the drawbar 18 of the traction vehicle is inserted. At the right of Fig. 2 is indicated a rear wheel 20 of the traction vehicle, and above that is a seat 22 forming the operator's station.

The hitching mechanism per se includes a bracket 24 secured to the upper strip 14 on the tongue of the trailing implement at a point some distance rearwardly of the forward end thereof. The bracket 24 is preferably a U-shaped bracket having upstanding legs, through which are formed registering holes at their upper ends. A link 26 formed of strap metal, with its edges disposed vertically, is formed with a loop or bearing 28, which fits between the legs of the U-shaped bracket 24. A bolt or rivet 30 is inserted through the holes in the legs of the bracket, and through the loop 28, pivotally mounting the link 26 in the bracket 24.

The link 26 extends forwardly and terminates at a point ahead of the forward end of the tongue, where there is formed a loop 32 having a closed forward end 34 and a closed rear end 36.

Pivotally mounted in the loop 32 between the sides thereof is an actuating handle 38, mounted by means of a bolt or rivet 40. The actuating handle 38 extends upwardly from the free end of the link 26 and at its top is provided with a lateral extension 42 forming a hand grip.

It will be noted that the upper end of the handle 38 is disposed rearwardly of the seat 22 of the traction vehicle. In the full line position shown in Fig. 1, the handle is near the operator's station 22 and is prevented from falling forward by resting on the forward end 34 of the loop 32. In this position it is easily grasped by the operator. The dot-dash position of the handle 38 indicates the position the handle assumes when it is not desired to manipulate it. The handle is retained in this position by resting on the rearward end 36 of the loop 32. In this alternate position it is still within the reach of the operator while being out of his way in the ordinary operation of the vehicle.

A connecting pin 44 having an upper forked extremity is pivoted adjacent the forward end of the link 26 by means of a bolt passing through the forked extremity and a slot 46 formed in the link. The forward end of the fork 16 on the trailer tongue is provided with registering holes 48, which are adapted to register also with a hole 50 in the rear end of the drawbar of the traction vehicle. Mounted on the upper surface of the work 16 is a reinforcing element 52 provided with a central bore in register with the holes 48. The pin 44 is adapted to be inserted into the holes in the tongue and drawbar by lowering the free end of the link 26, and of course, to be withdrawn by raising the link, the link being actuated by the actuating handle 38.

Mounted on the upper surface of the fork 16 is a guide bracket 54 in the form of an inverted U. The sides of this bracket straddle the link 26 and serve to guide the link accurately in its vertical movements. The top of the bracket 54 being closed, prevents the link 26 from being withdrawn out of the bracket. In the position of the link 26 in Fig. 1, the connecting pin 44 is in connected position. A bolt and spacer 56 secured in the bracket 54 limits the lowering of the link 26 to the position shown in Fig. 1, with the connecting pin in connected position.

If it is desired to lock the hitch in connected position, for instance, when a trip on the road is to be taken, a lock bolt 58 of any conventional form can be inserted through holes positioned directly above the link, in its lowermost position. This locks the link in locked position.

If it should be desired to lock the hitching mechanism in its disconnected position, the link 26 can be raised and the bolt 58 inserted under the link for locking it in that position. The bracket 54 is long enough and the holes for the bolt 58 are so positioned, to enable the link 26 to be positioned either above or below the bolt 58.

It will be seen, therefore, that in the normal operation of connecting and disconnecting a trailing implement and a traction vehicle, the connection may be made by the operator, while in an operating position, without the necessity of dismounting therefrom.

While I have shown a particular embodiment of my invention it will be understood of course that I do not wish to be limited thereto since many modifications may be made, and I therefore contemplate by the claims appended hereto to cover any such modifications or substitutions of equivalents as fall within the true spirit and scope of my invention.

I claim:

1. A trailer hitch for connection between the tongue of a trailing implement and drawbar of a traction vehicle, said tongue having a forked end for receiving said drawbar, said fork and drawbar having holes therethrough adapted to come into registration, comprising, a bracket mounted on said tongue, a link pivoted for vertical swinging in said bracket and extending toward the end of said tongue and forwardly beyond said holes, a connecting pin pivoted on said link extending downwardly and adapted to fit in said registering holes, an actuating handle pivoted in the free end of said link and extending upwardly therefrom, an inverted U-shaped bracket mounted on said tongue, said link adapted to swing between the sides of said U-shaped bracket, and fixed stop means in said bracket for determining the lower limit of movement of said link, said bracket having holes through the sides thereof intermediate said stop and the top of said bracket for the reception of a bolt therethrough, the bracket being of such a length and said holes being so positioned therein that space is provided below and above said holes to accommodate said link, respectively.

2. A trailer hitch for connection between the tongue of a trailing implement and drawbar on a traction vehicle, said tongue having a forked end for receiving said drawbar, said fork and drawbar having holes therethrough adapted to come into registration, comprising, a bracket mounted on the tongue, a link pivoted for vertical swinging in said bracket and extending toward the end of the tongue and forwardly beyond said holes, a connecting pin pivoted on said link extending downwardly and adapted to fit in said registering holes, said link having a substantially closed loop on its forward end, the element forming said loop being of substantial vertical dimension, and an actuating handle pivoted in said loop in the free end of said link and extending upwardly therefrom, the pivot point of said handle being below the top marginal edge of said loop, and the top marginal edge of said loop being engageable by said handle and thereby effective for limiting the pivoting movement of the handle.

3. A trailer hitch for connection between the tongue of a trailing implement and drawbar on a traction vehicle, said tractor having an operator's station elevated above said drawbar, said tongue having a forked end for receiving said drawbar, said fork and drawbar having holes therethrough adapted to come into registration, comprising, a bracket mounted on the tongue, a link pivoted for vertical swinging in said bracket and extending toward the end of the tongue and forwardly beyond said holes, a connecting pin pivoted on said link extending downwardly and adapted to fit in said registering holes, said link having a substantially closed loop on its forward end, the element forming said loop having substantial vertical dimension, and an actuating handle pivoted in said loop in the free end of said link, said operating handle extending upwardly to a point adjacent said operator's station, the pivot point of said handle being below the top marginal edge of said loop, and the top marginal edge of said loop being engageable by said handle and thereby effective for limiting the pivoting movement of said actuating handle, said handle being movable in one direction to a position closely adjacent said operator's station and in the other direction to a position removed from said operator's station.

DAVID W. SHOOK.

REFERENCES CITED

The following references are of record in the file of this patent:

UNITED STATES PATENTS

| Number | Name | Date |
| --- | --- | --- |
| 372,979 | Hughey | Nov. 8, 1887 |
| 573,724 | Thomson | Dec. 22, 1896 |
| 870,177 | Hurd | Nov. 5, 1907 |
| 945,683 | Beydler et al. | Jan. 4, 1910 |
| 1,112,214 | Johnson | Sept. 29, 1914 |
| 1,692,071 | Austin et al. | Nov. 20, 1928 |
| 2,002,922 | Oinken | May 28, 1935 |